United States Patent
Akopian et al.

(10) Patent No.: US 6,473,694 B1
(45) Date of Patent: Oct. 29, 2002

(54) METHOD, APPARATUS AND SYSTEM FOR ESTIMATING USER POSITION WITH A SATELLITE POSITIONING SYSTEM IN POOR SIGNAL CONDITIONS

(75) Inventors: David Akopian; Jari Syrjarinne, both of Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/828,594

(22) Filed: Apr. 6, 2001

(51) Int. Cl.[7] ............................ G01S 13/00; H04B 7/185
(52) U.S. Cl. .................................. 701/213; 342/357.01
(58) Field of Search ................................. 701/200, 207, 701/213–215; 342/352–353, 357.01–357.04, 357.06–357.09, 357.12, 357.15–357.17, 358; 455/427, 432, 130, 132, 152.1

(56) References Cited

U.S. PATENT DOCUMENTS

| | | | | |
|---|---|---|---|---|
| 5,390,124 A | * | 2/1995 | Kyrtsos | 701/215 |
| 6,014,101 A | * | 1/2000 | Loomis | 345/357.02 |
| 6,047,192 A | * | 4/2000 | Maloney et al. | 455/456 |
| 6,268,824 B1 | * | 7/2001 | Zhodzishky et al. | 342/357.04 |

FOREIGN PATENT DOCUMENTS

WO  WO 99/53338  10/1999

OTHER PUBLICATIONS

"Time Recovery through fusion of inaccurate network timing assistance with GPS measurement" Proc. 3rd Int. Conference on information Fusion, Paris, France, Jul. 10, 2000, vol. II, pp. WeD5–3–WeD5–10.

"Possibilities for GPS Time recovery with GSM network assistance" in Proc., ION GPS 2000, Salt Lake City, Utah, USA, Sep. 19–22, 2000.

* cited by examiner

Primary Examiner—William A. Cuchlinski, Jr.
Assistant Examiner—Thu Nguyen
(74) Attorney, Agent, or Firm—Ware, Freesola, Van Der Sluys & Adolphson LLP (57) ABSTRACT

A method and corresponding apparatus and system for solving for the position of a satellite positioning system receiver having a receiver clock with a receiver clock offset and responsive to ranging codes from some number of satellites, the ranging code from each satellite including a navigation component conveying information about the satellite and having a time of flight from the satellite, the method of use in signal conditions where the ranging codes can be baseband processed so that at least a repeating part of the pseudorange for each satellite can be determined. The method includes the system time at arrival, i.e. for example the time or arrival according to GPS time, as an independent variable of the pseudorange function for each of the ranging codes, an independent variable in addition to the receiver position, and solves simultaneously for the receiver position and the system time at arrival.

31 Claims, 3 Drawing Sheets

METHOD, APPARATUS AND SYSTEM FOR ESTIMATING USER POSITION WITH A SATELLITE POSITIONING SYSTEM IN POOR SIGNAL CONDITIONS

FIELD OF THE INVENTION

The present invention relates to time-of-arrival ranging receivers, and more specifically to global positioning system (GPS) receivers.

BACKGROUND OF THE INVENTION

A global positioning system (GPS) receiver measures the time of arrival of a satellite ranging code provided by a GPS satellite. Based on the measured time of arrival of the ranging code (which includes orbit parameters and a timestamp indicating when the spacecraft transmitted the ranging code), the receiver determines the time required for the signal to propagate from the satellite to the receiver, and then multiplies this time by the speed of light to obtain a so-called pseudorange; the term pseudorange is used because there are a number of errors involved in the above measurement, the primary error being the error in the time of arrival of the signal because of an offset in the receiver clock from true GPS system time. The true range is just the difference between the time of reception of a specific code phase (of the ranging code) by the GPS receiver and the time of transmission of the specific code phase by the satellite multiplied by the speed of light, i.e.

$$r=(T_u-T_s)c, \quad (1)$$

where r is the (true) range, $T_u$ is the GPS system time at which a specific code phase is received by the GPS receiver (i.e. the user of the GPS), $T_s$ is the GPS system time at which the specific code phase was transmitted, and c is the speed of light. Because of an offset $t_u$ of the receiver clock from GPS system time, what is measured is not the true range r but a pseudorange ρ, related to the true range according to, $$\rho=c[(T_u+t_u)-T_s]=r+ct_u. \quad (2)$$

Figure 1:
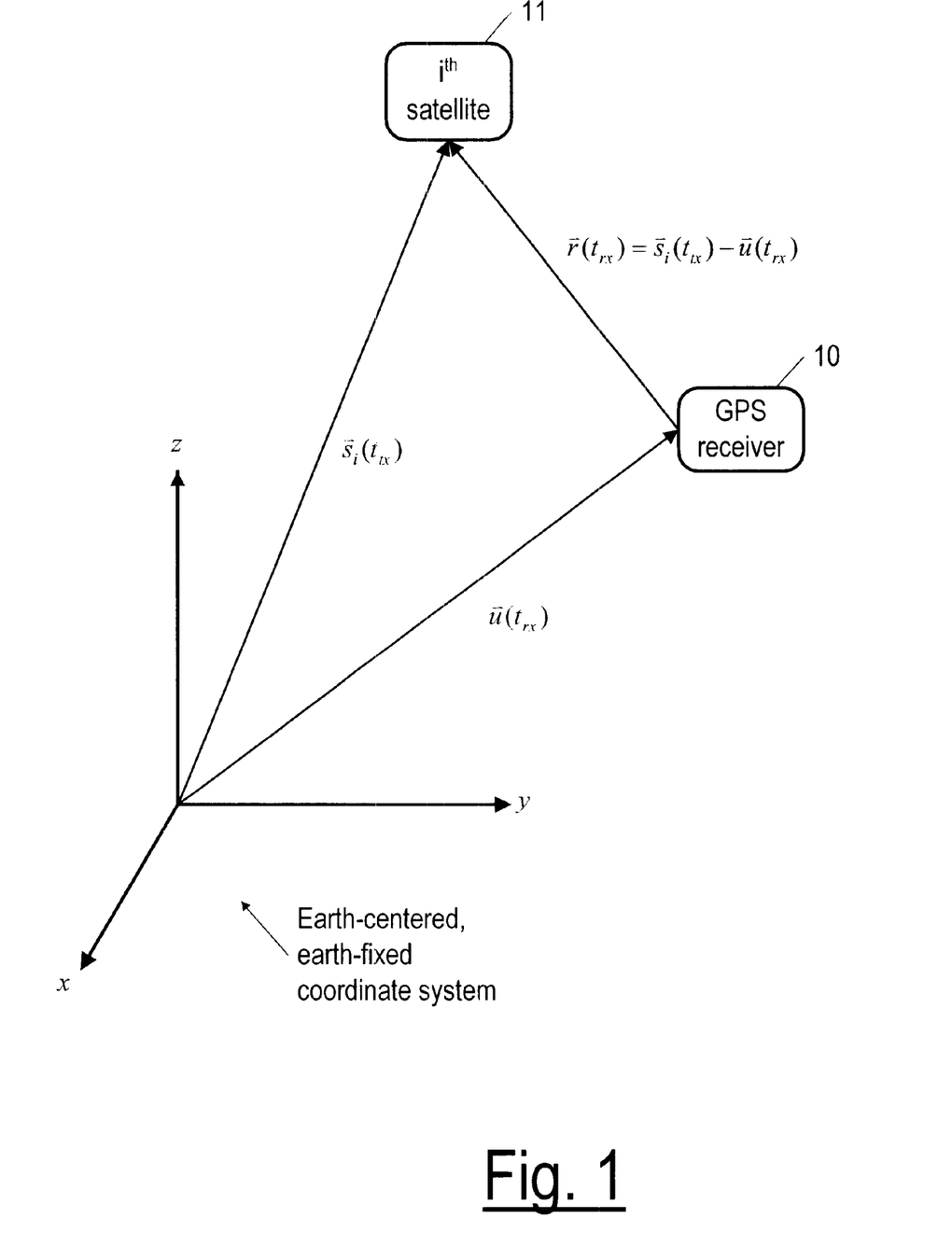
FIG. 1 is an illustration of the coordinate system used in the method of the invention.

The true range r depends on the sought-after user position $\vec{u}$ (at the time of receipt of the specific code phase) as well as on the position $\vec{s}$ of the satellite transmitting the specific code phase (i.e. the position of the satellite at the time of transmission of the specific code phase of the ranging code), according to simply, $$r=\|\vec{s}(t_{tx})-\vec{u}(t_{rx})\|, \quad (3)$$

where the time of transmission $t_{tx}$ and the time of reception $t_{rx}$ are both according to the same clock, the GPS system clock. (FIG. 1 illustrates the notation of equation (3).) Therefore, from equations (2) and (3), the (measured) pseudorange depends on the sought-after user position and receiver clock offset according to, $$\rho=\|\vec{s}(t_{tx})-\vec{u}(t_{rx})\|+ct_u, \quad (4)$$

in which the satellite position $\vec{s}(t_{tx})$ is known from the navigation data modulating the ranging code, since the navigation data provide the orbit parameters and a timestamp indicating the time at which the spacecraft transmitted the ranging code, and so indicating the location of the spacecraft along its orbit at the time of transmitting the (specific code phase of the) ranging code.

The problem of determining the offset of the receiver clock is called the time-recovery problem. The prior art teaches solving for the receiver clock offset, as part of the solution for the user position, using various techniques, including linearizing a system of equations for pseudoranges from four or more satellites (using least squares estimation in case of more than four satellites) as well as other techniques such as using a Kalman filter. In a typical solution, at least four satellites are needed because there are four unknowns being solved for all three coordinates of the user position and the receiver clock offset. The approach based on linearizing a system of four pseudorange equations begins with the pseudorange equation, i.e. equation (4), for each of four satellites, $$\begin{aligned}\rho_i &= \|\vec{s}_i(t_{tx})-\vec{u}(t_{rx})\|+ct_u \\ &= \sqrt{(x_i-x_u)^2+(y_i-y_u)^2+(z_i-z_u)^2}+ct_u \\ &= f_i(x_u,y_u,z_u,t_u), \text{ for } i=1,2\ldots,4.\end{aligned} \quad (5)$$

The method the Taylor-series expands each of the equations (5) about an estimated position $\hat{\vec{u}}$ (related to the sought-after user position $\vec{u}$ according to $\vec{u}=\hat{\vec{u}}+\Delta\vec{u}$) and an estimated offset $\hat{t}_u$ related to the sought-after receiver offset $t_u$ according to $t_u=\hat{t}_u+\Delta t_u$), and neglects second-order and higher terms in the expansion, leaving, $$\rho_i = f_i(\hat{\vec{u}},\hat{t}_u)+\nabla_u f_i(\hat{\vec{u}},\hat{t}_u)\cdot\Delta\vec{u}+\frac{\partial f_i(\hat{\vec{u}},\hat{t}_u)}{\partial t_u}\Delta t_u, \text{ for } i=1,2\ldots,4 \quad (6)$$

where the notations $\nabla_u f_i(\hat{\vec{u}},\hat{t}_u)$ and $\partial f_i(\hat{\vec{u}},\hat{t}_u)/\partial t_u$ indicate that the function $f$ is to be treated as a function of $\vec{u}$ and $t_u$ for the indicated differentiation, and the result evaluated at $\hat{\vec{u}}$ and $\hat{t}_u$. Using equations (5), the equations (6) become, $$\rho_i = \hat{\rho}_i - \frac{\vec{s}_i-\hat{\vec{u}}}{\hat{r}_i}\Delta\vec{u}+c\Delta t_u, \text{ for } i=1,2\ldots,4, \quad (7)$$

with $\hat{f}_i$ being used in place of $f_i(\hat{\vec{u}},\hat{t}_u)$ in eq. (6). Using $$\vec{a}_i = \frac{\hat{\vec{s}}_i-\hat{\vec{u}}}{\hat{r}_i}$$

and $\Delta f_i=\hat{f}_i-f_i$, equations (7) can be written as, $$\Delta f_i=\vec{a}_i\cdot\Delta\vec{u}+c\Delta t_u, \text{ for } i=1,2,\ldots,4, \quad (8)$$

and by constructing the vectors and matrix, $$\Delta\vec{\rho}\equiv\begin{pmatrix}\Delta\rho_1\\\Delta\rho_2\\\Delta\rho_3\\\Delta\rho_4\end{pmatrix} H=\begin{pmatrix}a_{x1}&a_{y1}&a_{z1}&1\\a_{x2}&a_{y2}&a_{z2}&1\\a_{x3}&a_{y3}&a_{z3}&1\\a_{x4}&a_{y4}&a_{z4}&1\end{pmatrix} \text{ and } \Delta x=\begin{pmatrix}\Delta x_u\\\Delta y_u\\\Delta z_u\\-ct_u\end{pmatrix}, \quad (9)$$

equations (8) can be written as, $$\Delta\vec{\rho}=H\Delta\vec{x} \quad (10)$$

which has the solution, $$\Delta\vec{x}=H^{-1}\Delta\vec{\rho}. \quad (11)$$

When navigating by GPS in weak signal conditions such that the navigation component of the navigation signal cannot be decoded, the time when the signal is received is not precisely known. That time, when expressed according to the GPS clock, is called here simply GPS time at arrival and is indicated by the notation τ. It differs from the time at which the signal is transmitted by a satellite (i.e. $t_{tx}$ in equation (5)) by the time of flight $t_f$ of the signal from the satellite to the GPS receiver. In terms of the GPS time at arrival τ and the time of flight $t_f$, the pseudorange given by equation (2) can be written as, $$\rho = c\lfloor(T_u+t_u)-(\tau-t_f)\rfloor = c(T_u+t_u)-c(\tau-t_f) = c(t_u+t_f), \quad (2')$$

since, by definition, $T_u = \tau$.

In normal circumstances (i.e. strong signal conditions), the time at which the ranging code was sent from the spacecraft, τ−$t_f$ (i.e., in the notation of equation (2), simply $T_s$), is determined (to within the offset of the satellite clock δt, here taken to be negligible) by decoding the received navigation message. However, when the navigation data (containing the time of transmission/timestamp and the satellite orbit parameters) included in the ranging code sent by the satellite cannot be demodulated (decoded), but the baseband measurements (i.e. aligning the replica code with the transmitted code) can still be made, it is necessary to determine not only the receiver offset $t_u$, but also the time $t_{tx}$ at which the signal was sent by the satellite, which is the GPS time at arrival τ (the time according to the GPS clock at which the signal was received) minus the unknown time of flight, $t_f$.

In the case of signal conditions that are so poor that the navigation component of the ranging code cannot be demodulated, the prior art teaches solving for the user position based on a five-step procedure. The procedure is based on the fact that the pseudorange $\rho_i$ to the $i^{th}$ spacecraft, which is a measured quantity in the case of strong signal conditions (as opposed to a calculated quantity like the user position), is the sum of two components, and accordingly can be written as, $$\rho_i = \rho_i^{(1)} + \rho_i^{(2)} \quad (12)$$

where $\rho_i^{(1)}$ is obtained from the navigation data included with the ranging code, and is given by $$\rho_i^{(1)} = c\left\lceil \frac{t_f}{1ms} \right\rceil \quad (13)$$

where ⌈ . . . ⌉ indicates the ceiling function (next greatest integer), and $\rho_i^{(2)}$ is obtained from baseband processing the ranging code (i.e. aligning the replica with the transmitted code), giving the submillisecond part of the pseudorange. The part $\rho_i^{(1)}$ is here sometimes called the millisecond part, since it gives the pseudorange only to within a millisecond, i.e. to within the speed of light times a millisecond, or nearly 300 km. When the first component $\rho_i^{(1)}$ cannot be determined (measured) because the navigation data cannot be demodulated, only the second component $\rho_i^{(2)}$ can be determined (measured). However, with cellular network assistance or some other means of assistance giving us the spacecraft orbit parameters (but not their precise position in the orbits) and the location of a nearby base station, (determined by methods known in the art) the prior art teaches solving for the user position in six steps as follows.

1. Make an estimate of the GPS time at arrival. The estimate can be based on either the local clock or a clock at the reference position.

2. Make estimates of the times of flight for each satellite, using e.g. satellite positions at the estimated GPS time at arrival. If no estimates are otherwise available, use an average of around 70 ms.

3. From the estimates of the GPS time at arrival and times of flight, compute the times of transmission for each satellite and then the satellite positions at those times using orbital parameters for each of the satellites acquired via cellular network assistance.

4. With the satellite positions approximately so determined, use the position of a nearby base station (called here the reference position) to calculate the millisecond part $\rho_i^{(1)}$ of the pseudoranges for each satellite. The full pseudoranges to the receiver (not to base station) are computed by combining the millisecond part $\rho_i^{(1)}$ and the submillisecond part $\rho_i^{(2)}$, where the submillisecond part $\rho_i^{(2)}$ is taken (determined) from the receiver baseband.

5. With the pseudoranges and satellite positions approximately so determined, use the iterative least squares method to determine an estimate of the receiver position. The iterative least squares method gives not only the position, but also an estimate of the a uncertainty in the solution.

6. Repeat steps 1–5 using different estimates of the GPS time at arrival selected from a grid of values around the value provided for example by the cellular network assistance. Use as the user position the value for which the uncertainty is the smallest.

The third step above is quite apparent from the description above. If the time of transmission is known, then the satellite positions are calculated from this time and from orbital parameters using formulas well known in the field of GPS.

In the fifth step, using the spacecraft positions calculated in step three, the user position $\vec{u}(t_{rx})$ and the receiver clock offset $t_u$ are solved using $$\rho_i^{(1)} + \rho_i^{(2)} = \|\vec{s}_i(\tau - t_i^{(f)}) - \vec{u}(t_{rx})\| + ct_u \quad (15)$$

At least four such equations are needed, so as to have a system of at least four equations in four unknowns (user position coordinates and receiver clock offset). If we have more than four equations, we can solve the system of equations using least squares, which will give us an uncertainty (error) as part of the solution, and we can iterate on the initial guesses (of first component of the pseudoranges, the times of flight, and the user position) to make the uncertainty smaller, in what is called iterated least squares.

As is evident from the above description, the procedure for solving for user position in case of weak signal conditions is time consuming. It would be advantageous to have a more efficient (faster) way of determining a GPS position-velocity-time (PVT) solution in weak signal conditions, conditions such that the navigation data cannot be demodulated (decoded) but the baseband measurement can still be performed.

SUMMARY OF THE INVENTION

Accordingly, the present invention provides a method and corresponding apparatus and system for solving for the position of a satellite positioning system receiver, the receiver having a receiver clock with a receiver clock offset and responsive to ranging codes from some number of satellites, the ranging code from each satellite including a navigation component conveying information about the satellite and having a time of flight from the satellite, the method of use in signal conditions where the ranging codes can be baseband processed so that at least a repeating part of the pseudorange for each satellite can be determined, the method including the steps of: including the system time at arrival as an independent and additional variable of the pseudorange function for each of the ranging codes, an independent variable in addition to the receiver position; providing estimates of the times of flight of the ranging codes and of the repeating part of the pseudoranges for each of the ranging codes; receiving information about the satellite sufficient to determine the orbits of the satellites, although not necessarily the positions of the satellites in their orbits; and solving simultaneously for the receiver position and the system time at arrival.

In a further aspect of the invention, the method also includes the receiver clock offset as an independent and additional variable. In some such applications, the method also includes the step of performing a Taylor-series expansion of the pseudorange function about an initial guess or estimate of each of the independent variables for as many of the satellites as there are independent variables thereby providing a system of pseudorange equations. The pseudorange equations are sometimes solved using a determinate single-point solution that is either an iterative least squares solution or an exact algebraic solution, depending on the number of pseudorange equations, and sometimes solved using a Kalman filter.

In another further aspect of the invention, the information about each satellite includes the orbit parameters for each satellite.

In yet another further aspect of the invention, the satellite positioning system is the global satellite positioning system (GPS) and the system time at arrival is the GPS time at arrival.

In yet still another further aspect of the invention, the repeating part of the pseudorange is the submillisecond part of the pseudorange.

In yet still even another further aspect of the invention, the method is of use in signal conditions where the ranging codes can be baseband processed providing at least the submillisecond part of the pseudorange.

Compared to the prior art procedure explained above, the present invention solves for the user position using the following steps, of which the first four are the same as in the prior art.

1. Make an estimate of the GPS time at arrival. The estimate can be based on either the local clock or a clock at the reference position.
2. Make estimates of the times of flight for each satellite, using e.g. satellite positions at the estimated GPS time at arrival. If no estimates are otherwise available, use an average of around 70 ms.
3. From the estimates of the GPS time at arrival and the times of flight, compute the times of transmission for each satellite and then the satellite positions at those times using orbital parameters for each of the satellites acquired via cellular network assistance.
4. With the satellite positions approximately so determined, use the position of a nearby base station (called here the reference position) to calculate the millisecond part $\rho_i^{(1)}$ of the pseudoranges for each satellite. The full pseudoranges to the receiver (not to base station) are computed by combining the millisecond part $\rho_i^{(1)}$ and the submillisecond part $\rho_i^{(2)}$ where the submillisecond part $\rho_i^{(2)}$ is taken (determined) from the receiver baseband.
5. With the pseudoranges and satellite positions known, instead of using the iterative least squares method as in the prior art, include in the pseudorange equations the unknown GPS time at arrival τ as an additional, independent variable. Then use the iterative least squares technique for the modified equations, the iteration here being different than in the prior art. In the conventional solution of the prior art, the satellite positions are fixed while iterations refine the estimate of the user position. Here the satellite positions and the user position are refined at the same time. The satellite positions are refined by iterating on the GPS time at arrival τ, which amounts to adjusting the positions of the satellites in their orbits, with the orbits themselves known via cellular network assistance or some other source. (New estimates of the GPS time at arrival and previous estimates of the times of flight are used to compute new times of transmission. The new times of transmission are used to compute new satellite positions. Then the times of flight and pseudoranges are updated.) Each iteration gives a new estimate of the user position, the GPS time at arrival, and the receiver clock offset. The iterations here converge, i.e. the solutions stop changing, and so the iteration here is fundamentally different than that of the prior art.

In essence, the invention collapses the last steps of the solution of the prior art into one step by introducing the GPS time at arrival τ (the time at which the user receives the ranging code) as a fifth unknown in the pseudorange equation, $$\rho_i = \|\vec{s}_i(\tau - \tilde{t}_i^{(f)}) - \vec{u}(t_{rx})\| + ct_u \qquad (16)$$

where the pseudoranges $\rho_i$ and the times of flight $\tilde{t}_i^{(f)}$ are (approximately) known by some means. Thus, the invention provides five unknowns (τ, $u_x$, $u_y$, $u_z$, $t_u$) which are solvable by at least five pseudorange equations (i.e. equation (16) for five satellites). In case of five such pseudorange equations, the invention provides either a determinate solution or a Kalman filter solution. In case of more than five pseudorange equations, the invention provides a solution using either the method of least squares or a Kalman filter.

The method provided by the invention is faster than methods known in the art (from five to ten times faster), and it produces clock times (receiver offsets) that are as accurate as at least some of the prior art methods (in particular, the so-called SSE method). In the method using a filter such as a Kalman filter, the time error can be determined more precisely and the extra computation load is minimized when the time error solution is integrated into the Kalman filter.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The present invention will now be described in the particular context of the so-called global positioning system (GPS). There are, however, other satellite positioning systems in use today, and it is possible that there will be new satellite positioning systems developed in the future. It is to be understood that although the description here is made specific to the GPS context, the same description could be made in the specific context of any other analogous satellite positioning system by changing the terms of art used here to the corresponding terms in the other satellite positioning system. For example, the GPS term pseudorange used here would be changed to the corresponding term (which might also be pseudorange) used in the context of the other satellite positioning system. As another example, the term GPS time at arrival should be understood to be used in the GPS context, and in the more general context of any other analogous satellite positioning system, the term system time at arrival would be used. As yet another example, the term submillisecond part of the ranging code tends to be GPS specific, and that term when used here should be understood to correspond more generally to a repeating part (the less significant part) of the ranging code.

The present invention extends the methods of the prior art for determining the position of a global positioning system (GPS) receiver when the ranging code cannot be demodulated (decoded) because of poor signal conditions by Taylor-series expanding the pseudorange function $f(\vec{u}, t_u, \tau)$, given by the equation $$\rho_i = \|\vec{s}_i(\tau - \tilde{t}_i^{(f)}) - \vec{u}(t_{rx})\| + ct_u = f(\vec{u}, t_u, \tau), \quad (16)$$

not only about some user position $\vec{u}(t_{rx})$ and some receiver offset $t_u$, as in equations (6) of the prior art, but also about the GPS time at arrival $\tau$, i.e. the (single) time, according to the GPS clock, at which the user (GPS receiver) receives the ranging codes from the different spacecraft. Although a precise determination of the receiver clock offset $t_u$ should include the same information as a precise determination of what is here called the GPS time at arrival $\tau$ (in the sense that if you know $t_u$ precisely, you should know $\tau$), the GPS time at arrival as used in the invention likely does not convey the same information as the receiver clock offset. The GPS time at arrival is treated in the invention as independent of the receiver clock offset. By introducing the GPS time at arrival $\tau$ as one additional degree of freedom for the solution of the system of pseudorange equations (16), the invention approximately accounts for the uncertainties (errors) in the times of flight estimates $\tilde{t}_i^{(f)}$ for the different spacecraft at positions $\vec{s}_i(\tau - \tilde{t}_i^{(f)})$.

Figure 2:
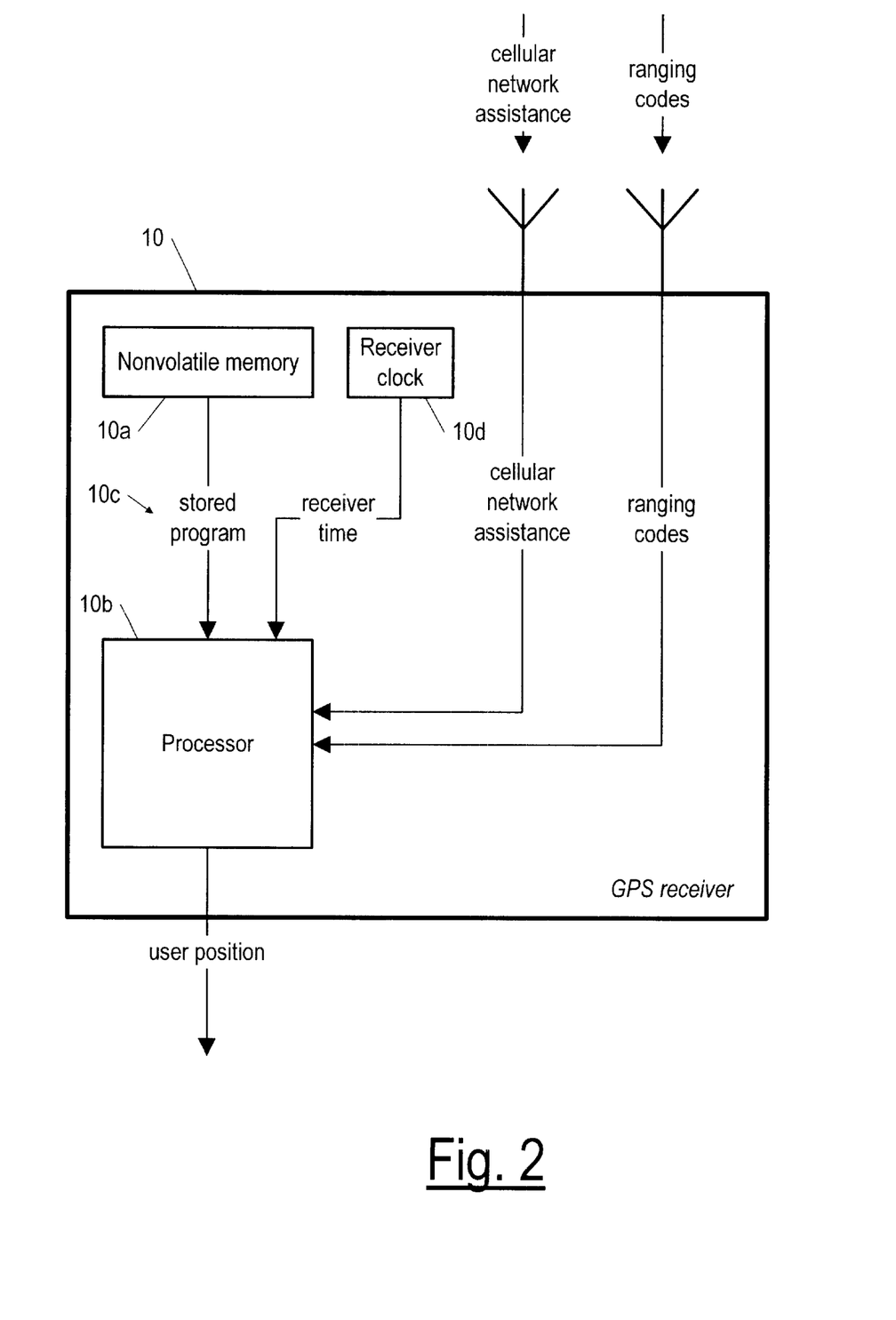
FIG. 2 is a schematic of a GPS receiver executing a program for solving for the position of the GPS receiver (the user) according to the invention.

Referring now to FIG. 2, in the preferred embodiment of the invention, a GPS receiver 10 includes a nonvolatile memory 10a for storing a program 10c that, when running on a processor 10b also included in the GPS receiver, determines the position of the GPS receiver (user) by solving a system of pseudorange equations treating the GPS time at arrival $\tau$ as a fifth variable, in addition to the user position (three variables, one for each coordinate) and the GPS receiver clock offset from GPS system time (i.e. time according to the GPS clock). The program 10b solves the system of pseudorange equations by linearizing the pseudorange equations as in the prior art, but instead of Taylor-series expanding only about some initial guess or estimate of the user position and about some initial guess or estimate of the receiver offset, as in equations (6) above, the invention also Taylor-series expands the pseudorange equations about the GPS time at arrival. It should be understood that although in the preferred embodiment of the invention there is a Taylor series expansion about some initial guess or estimate of the five variables of the pseudorange equation (16'), the invention is the use of the GPS time at arrival as at least one variable in solving for the position (or other aspect of the state of motion of) a user (GPS receiver), regardless of whether in the course of the solution a Taylor series expansion is performed.

In linearizing the pseudorange equation (16') including the GPS time at arrival $\tau$, the pseudorange equations for each of the various (at least five) satellites are written as, $$\rho_i = \|\vec{s}_i(t_{tx}) - \vec{u}(t_{rx})\| + ct_u \quad (17)$$

$$= \sqrt{(x_i(\tau - t_f^{(i)}) - x_u)^2 + (y_i(\tau - t_f^{(i)}) - y_u)^2 + (z_i(\tau - t_f^{(i)}) - z_u)^2} + ct_u$$

$$= f_i(x_u, y_u, z_u, \tau, t_u), \text{ for } i = 1, 2, \ldots, N.$$

where $\vec{s}_i(t_{tx})$, with components $(x_i, y_i, z_i)$, is the position of the $i^{th}$ satellite (out of N satellites, where N could be larger than four) at the time $t_{tx} = \tau - t_f^{(i)}$ at which the satellite transmits the specific code phase of the ranging code, $\tau$ is the GPS time at arrival, $t_f^{(i)}$ is the time of flight of the ranging code, $\vec{u}(t_{rx})$ is the position of the GPS receiver (user) at the time $t_{rx}$ of reception of the specific code phase of the ranging code, $t_u$ is the offset from GPS system time of the receiver clock, and c is the speed of light.

Now instead of Taylor-series expanding the pseudorange function $f$ about only some estimated receiver position $\hat{\vec{u}}$ and some estimated receiver offset $\hat{t}_u$, i.e. about $(\hat{\vec{u}}, \hat{t}_u)$, the function $f$ is Taylor-series expanded about the five-dimensional quasi-point $(\hat{\vec{u}}, \hat{\tau}, \hat{t}_u)$, i.e.

$$\rho_i = f_i(\hat{\vec{u}}, \hat{\tau}, \hat{t}_u) + \nabla_u f_i(\hat{\vec{u}}, \hat{\tau}, \hat{t}_u) \cdot \Delta \vec{u} + \frac{\partial f_i(\hat{\vec{u}}, \hat{\tau}, \hat{t}_u)}{\partial \tau} \Delta \tau + \frac{\partial f_i(\hat{\vec{u}}, \hat{\tau}, \hat{t}_u)}{\partial t_u} \Delta t_u \quad (18)$$

for i=1, . . . , N satellites, where the estimated user (GPS receiver) position $\hat{\vec{u}}$ is related to the sought-after user position $\vec{u}$ according to $\vec{u} = \hat{\vec{u}} + \Delta \vec{u}$, $\hat{\tau}$ is related to the sought-after GPS time at arrival $\tau$ according to $\tau = \hat{\tau} + \Delta \tau$, and the estimated receiver offset $\hat{t}_u$ is related to the sought-after receiver offset $t_u$ according to $t_u = \hat{t}_u + \Delta t_u$, and, finally, where the notations $\nabla_u f_i(\vec{\hat{u}}, \hat{\tau}, \hat{t}_u)$, $\partial f_i(\vec{\hat{u}}, \hat{\tau}, \hat{t}_u)/\partial \tau$ and $\partial f_i(\vec{\hat{u}}, \hat{\tau}, \hat{t}_u)/\partial t_u$ indicate that the function $f$ is to be treated as a function of $\vec{u}$, $\tau$ and $t_u$ for the indicated differentiation, and the result evaluated at $\vec{\hat{u}}$, $\hat{\tau}$ and $\hat{t}_u$. Using equations (17), the equations (18) become, $$\rho_i = \hat{\rho}_i - \frac{\vec{s}_i - \vec{\hat{u}}}{\hat{r}_i} \cdot \Delta \vec{u} + \frac{\vec{s}_i - \vec{\hat{u}}}{\hat{r}_i} \cdot \vec{v}_i + c\Delta t_u, \text{ for } i = 1, 2, \ldots, N, \quad (19)$$

where $\vec{s}_i$ is the satellite position at the estimated GPS time at arrival $\hat{\tau}$, i.e. $\vec{s}_i(\hat{\tau})$, $\hat{\rho}_i = \|\vec{s}_i(\hat{\tau}) - \vec{\hat{u}}\| + c\hat{t}_u = \hat{r}_i + c\hat{t}_u$, and $\vec{v}_i = \partial \vec{s}_i(\tau)/\partial \tau$ is the velocity of the $i^{th}$ satellite evaluated at the approximate GPS time at arrival $\hat{\tau}$.

Using $$\vec{a}_i = \frac{\vec{s}_i - \vec{\hat{u}}}{\hat{r}_i}$$

(with $\vec{s}_i$ evaluated at $\hat{\tau}$) and $\Delta \rho_i = \hat{\rho}_i - \rho_i$, equations (19) can be written as, $$\Delta \rho_i = \vec{a}_i \cdot (\Delta \vec{u} + \vec{v}_i \Delta \tau) + c\Delta t_u, \quad (20)$$

for $i=1,2,\ldots,N$ satellites, and by constructing the vectors and matrix (using for clarity of illustration only five satellites), $$\Delta \vec{\rho} \equiv \begin{pmatrix} \Delta \rho_1 \\ \Delta \rho_2 \\ \Delta \rho_3 \\ \Delta \rho_4 \\ \Delta \rho_5 \end{pmatrix} \quad H = \begin{pmatrix} a_{x1} & a_{y1} & a_{z1} & \vec{a}_1 \cdot \vec{v}_1 & 1 \\ a_{x2} & a_{y2} & a_{z2} & \vec{a}_2 \cdot \vec{v}_2 & 1 \\ a_{x3} & a_{y3} & a_{z3} & \vec{a}_3 \cdot \vec{v}_3 & 1 \\ a_{x4} & a_{y4} & a_{z4} & \vec{a}_4 \cdot \vec{v}_4 & 1 \\ a_{x5} & a_{y5} & a_{z5} & \vec{a}_5 \cdot \vec{v}_5 & 1 \end{pmatrix} \text{ and } \Delta \vec{x} = \begin{pmatrix} \Delta x_u \\ \Delta y_u \\ \Delta z_u \\ \Delta \tau \\ -ct_u \end{pmatrix}, \quad (21)$$

equations (19) can be written as, $$\Delta \vec{\rho} = H \Delta \vec{x}. \quad (22)$$

The use of the invention will be illustrated by application first to algorithmic solutions to the user position problem (i.e. either exact algebraic solutions or least squares solutions, both of which can be categorized as single-point solutions because of relying on only a single quasi-point as an initial guess to the user position problem), and then to Kalman filter solutions (which provide a smoothed navigation solution in which the effect of noise is reduced by taking into account two or more previous measurements as well as noise statistics).

Figure 3:
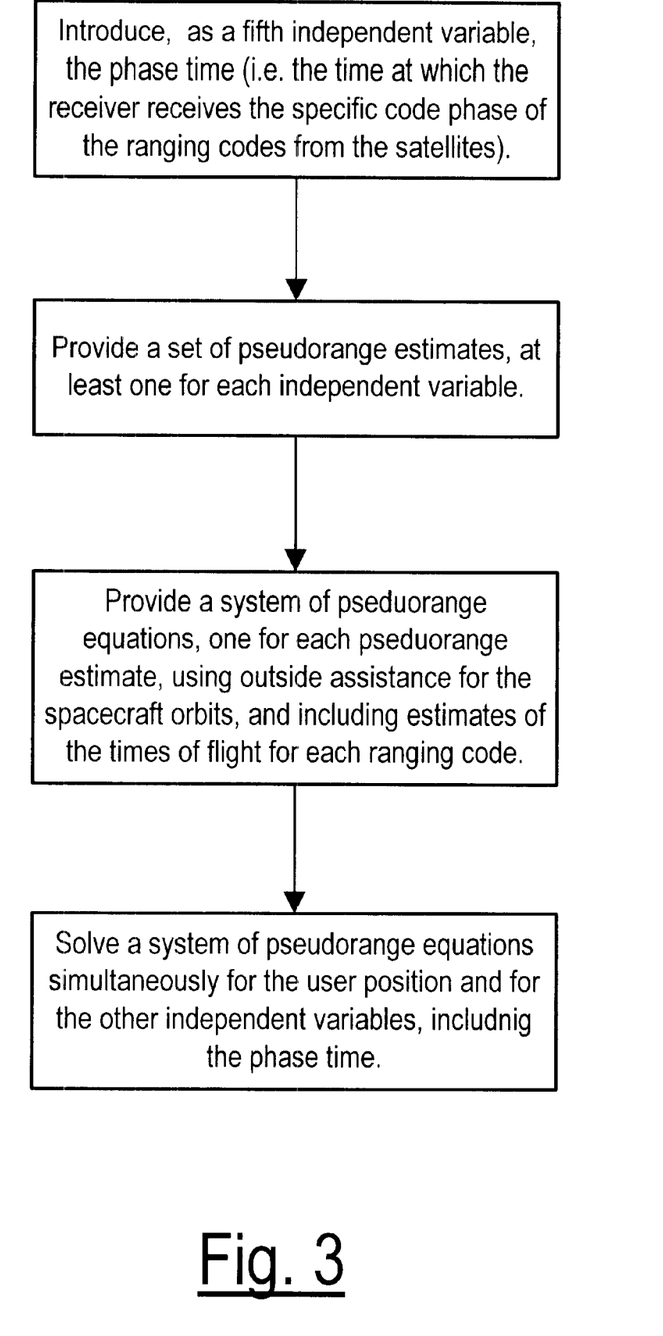
FIG. 3 is a flowchart of the method of the invention.

FIG. 3 is a flowchart of the invention, showing that in the preferred embodiment the invention uses five independent variables, as explained above, namely the user position, the receiver clock offset, and the GPS time at arrival, and with outside assistance determines a system of pseudorange equations which according to the invention are then solved simultaneously by any of a number of methods, two of which are as follows.

Algorithmic (or Single-point) Solution

For five satellites, provided that H is non-singular, equation (22) has the solution, $$\Delta \vec{x} = H^{-1} \Delta \vec{\rho}. \quad (23)$$

For more than five satellites, it has the least squares solution, $$\Delta \vec{x} = (H^T H)^{-1} H^T \Delta \vec{\rho}, \quad (24)$$

i.e. the value of $\Delta \vec{x}$ given by equation (24) minimizes the square of the residual vector $\vec{R}$ defined as, $$\vec{R}(\Delta \vec{x}) = H \Delta \vec{x} - \Delta \vec{\rho}. \quad (25)$$

The least squares solution at each iteration stage uses some guess for the receiver position $\vec{u}$, and then iterates to solve for the time of flight from each of the N satellites, using, $$t_{f,i} = \|\vec{s}_i(\tau - t_{f,i}) - \vec{u}(\tau)\|/c \quad (26)$$

where $i=1,\ldots,N$. If the solution results in a position/GPS time at arrival/offset estimation that is too far from the initial guess, i.e. if $\Delta \vec{x}$ is large, then another initial guess can be made and a new $\Delta \vec{x}$ can be calculated.

(Extended) Kalman Filter Solution

Background Information

A Kalman filter provides an estimate of a user's position based not only on current measurements, but also based on past estimates (more specifically, based on predictions of the current measurements). In essence, a Kalman filter provides a solution that filters out the effect of noise in current measurements. The discrete extended Kalman filter (EKF) is generally used with a stand-alone GPS receiver (as opposed to a network-assisted GPS receiver). Nevertheless, in cases where the tracking is often interrupted because of poor satellite signal quality, poor enough that the navigation component of the ranging code cannot be demodulated, cellular assistance in the form of orbit parameters and the location of a nearby cellular base station allows a Kalman filter to still provide the position of a user (GPS receiver), albeit an approximate position.

The Kalman filter formulation assumes a process model by which the state vector for the system including both the user and the GPS system (the space component, i.e. the satellites) is propagated from an earlier time to a later time. The state vector used here is taken to be, $$x_L = [xyz|\dot{x}\dot{y}\dot{z}|t_u f_{clock}|\tau \dot{\tau}], \quad (27)$$

where $\vec{u} = (x,y,z)$ is the user (GPS receiver) position at the time of reception of the specific code phase, $\dot{u} = (\dot{x}, \dot{y}, \dot{z}) = d\vec{u}/dt$ is the user velocity with respect to an internal time variable t (with the same rate of progression as the GPS time at arrival but with an unknown and irrelevant offset) and designated below by the discrete internal variable k (in e.g. equation (28)), $t_u$ is the offset in the user (GPS receiver) clock, $f_{clock}$ is the rate of progression of the user clock, $\tau$ is the GPS time at arrival according to the satellite clock (presumed to be correct), $\dot{\tau}$ is the drift in the satellite clock with respect to the internal time variable t. (Although the state vector of equation (27) is what is typically used in a Kalman filter solution, sometimes a state vector is defined to include fewer variables.)

A Kalman filter operates by processing all available measurements at each epoch, in what is called a measurement update step, and then propagating the state vector estimate and process noise covariance ahead to the next epoch, in what is called a time update step. Estimates of the state vector and process noise covariance after the measurement update are here indicated by a superscript "+", while estimates and covariances propagated ahead to the next epoch are indicated here by a superscript "−".

The process model described here (as one example) is the so-called low-dynamics model, i.e. the dynamical model usually used for GPS receivers in cars or boats, but not airplanes, for which the so-called high-dynamics model would be used. The process model, i.e. the state vector update equation, is here (in the case of the low-dynamics model) written as, $$x_L(k) = \Phi_L(\Delta t) x_L(k-1) + w_L(k-1) \tag{28}$$

where $x_L(k)$ is the state vector at the discrete time instance k (the subscript L being used to indicate that the low-dynamics model is being used), $w_L(k-1)$ is the process noise at instance k−1, $\Delta t$ is the discretization interval (i.e. the time difference between instance k and instance k−1), and $\Phi_L(\Delta t)$ is the one-step state transition matrix. (The Kalman filter described here is just an example. Once we obtain the modified pseudorange equation including the GPS time at arrival as one of the unknowns, we can use other dynamic models, besides the low-dynamics model, and other types of Kalman filters.)

The measurement model is here written as, $$y_L(k) = G_L(k) x_L(k) + \epsilon_L(k), \tag{29}$$

where $y_L(k)$ is a vector of measured (observed) quantities, $G_L(k)$ is the so-called connection matrix, connecting the state variables (components of $x_L(k)$) to the measured quantities (components of $y_L(k)$), and $\epsilon_L(k)$ is the measurement noise vector (the noise being assumed to be white, distributed normally as $N(0,R_L(k))$, i.e. with some predetermined measurement noise covariance matrix $R_L(k)$).

The state transistion matrix is here defined as $$\phi_L(\Delta t) = \begin{bmatrix} I & \Delta t I & 0 & 0 \\ 0 & I & 0 & 0 \\ 0 & 0 & \phi_{clock}(\Delta t) & 0 \\ 0 & 0 & 0 & \phi_{sat}(\Delta t) \end{bmatrix}, \tag{30}$$

where each element is a 2×2 matrix, where I is the 2×2 identity matrix, where $\Delta t$ is the discretization interval as above, where $\Phi_{clock}(\Delta t)$ is the transition matrix of a receiver clock process model, such as one of the widely used two-state models, $$\phi_{clock}(\Delta t) = \begin{bmatrix} 1 & \Delta t \\ 0 & 1 \end{bmatrix}, \tag{31}$$

and where $\Phi_{sat}(\Delta t)$ is the process model of satellite time, defined as, $$\phi_{sat}(\Delta t) = \begin{bmatrix} 1 & \Delta t \\ 0 & 1 \end{bmatrix}. \tag{32}$$

The initial condition used is $$\dot{\tau} = 1. \tag{33}$$

With the initial condition $\dot{\tau}=1$, the satellite time $\tau$ will be a linear function of time offset $\Delta t$, according to, $$\begin{bmatrix} \tau(k) \\ \dot{\tau}(k) \end{bmatrix} = \begin{bmatrix} 1 & \Delta t \\ 0 & 1 \end{bmatrix} \begin{bmatrix} \tau(k-1) \\ \dot{\tau}(k-1) \end{bmatrix}. \tag{34}$$

In the absence of process noise, the equation (34) provides that, $$\tau(k) = \Delta t + \tau(k-1). \tag{35}$$

Assuming the GPS time at arrival is accurate, the process noise covariance matrix is, $$Q_L(\Delta t) = \begin{bmatrix} Q_p & Q_{pv} & 0 & 0 \\ Q_{pv} & Q_v & 0 & 0 \\ 0 & 0 & Q_{clock}(\Delta t) & 0 \\ 0 & 0 & 0 & 0 \end{bmatrix}, \tag{36}$$

where the submatrices $Q_p, Q_{pv}, Q_v$ are components of the covariance matrix due to the position (p), velocity (v) or both (pv). The process noise covariance matrix $Q_L(\Delta t)$ can be modified to include a nonzero covariance submatrix (as the leftmost and bottommost element) for the satellite time process noise, either for the purpose of including corrections to the satellite clock or for tuning the Kalman filter. Using $Q_{sat}(\Delta t)$ as the appropriate submatrix, the process noise covariance matrix becomes, $$Q_L(\Delta t) = \begin{bmatrix} Q_p & Q_{pv} & 0 & 0 \\ Q_{pv} & Q_v & 0 & 0 \\ 0 & 0 & Q_{clock}(\Delta t) & 0 \\ 0 & 0 & 0 & Q_{sat}(\Delta t) \end{bmatrix}. \tag{37}$$

The Kalman filter also uses an error covariance matrix, here designated as P(k), defined as, $$P(k) = E[(x_L(k) - \hat{x}_L(k))(x_L(k) - \hat{x}_L(k))^T], \tag{38}$$

where $x_L(k)$ is the true value of the sought-after state vector, and $\hat{x}_L(k)$ is its estimate, and E[ ] denotes the mathematical (statistical) expectation of the bracketed quantity.

In using a Kalman filter, values must be provided for the measurement noise covariance matrix R associated with the measurement noise vector $\epsilon$ (see equation (29) above and its discussion following), the initial estimate $P_0^-$ of the error covariance matrix, and an initial estimate $\hat{x}_0^-$ of the state vector.

The Invention Applied to the Extended Kalman Filter

A Kalman filter solution according to the invention proceeds, in the preferred embodiment, is performed according to the following steps. First, compute the expected (predicted) pseudorange $\vec{\hat{\rho}}_k = [\hat{\rho}_{1,k}, \hat{\rho}_{2,k}, \ldots, \hat{\rho}_{N,k}]^t$ (for k=0 indicating the initial instant) based on the GPS satellite position and an a priori state estimate $\hat{x}_k^-$ of the state vector:

$$\hat{\rho}_{i,k} = \|\vec{s}_i(\hat{\tau}_k^- - t_f^{(i)}) - \vec{\hat{u}}_k^-\| + c \Delta \hat{t}_{u,k}^-, \tag{39}$$

for i=1,2, . . . , N satellites.

Next, construct the measurement connection matrix, $$G_k(\hat{x}_k^-) = \begin{pmatrix} \frac{\partial f_1}{\partial x} & \frac{\partial f_1}{\partial y} & \frac{\partial f_1}{\partial z} & \frac{\partial f_1}{\partial t_{sat}} & 1 \\ & & \cdots & & \\ \frac{\partial f_N}{\partial x} & \frac{\partial f_N}{\partial y} & \frac{\partial f_N}{\partial z} & \frac{\partial f_N}{\partial t_{sat}} & 1 \end{pmatrix}_{\hat{x}_k^-} \quad (40)$$

in which $f_i$ is the pseudorange function of equation (17), i.e.

$$f_i(x_u, y_u, z_u, \tau, t_u) = \|\vec{s}_i(t_{tx} = \hat{\tau} - \hat{t}_f^{(i)}) - \vec{u}(t_{rx})\| + ct_u.$$

Then compute the gain matrix $K_k$, using, $$K_k = P_k^- G_k^t (G_k P_k^- G_k^t + R_k)^{-1}, \quad (41)$$

and update the state vector and the covariance matrix according to, $$\hat{x}_k^+ = \hat{x}_k^- + K_k(\vec{\rho}_k - \vec{\hat{\rho}}_k) = \hat{x}_k^- - K_k \Delta \vec{\rho}_k$$

$$P_k^+ = (I - K_k G_k) P_k^- (I - K_k G_k)^t + K_k R_k K_k^t \quad (42)$$

(The measured pseudorange can be determined from the submillisecond fractions measured by the receiver and the estimated millisecond fractions obtained from previous estimates, or from the location of a nearby cellular base station, or by some other method.)

Then propagate the covariance matrix to the next measurement epoch, using, $$P_{k+1}^- = \Phi P_k^+ \Phi^t + Q_k. \quad (43)$$

Finally, propagate the state estimate to the next measurement epoch using the assumed process dynamics, i.e. according to, $$\hat{x}_{k+1}^- = \Phi \hat{x}_k^+. \quad (44)$$

The Kalman filter procedure as defined allows changing what are used as the components of the state vector; it allows removing those state vector components, during the course of the Kalman filter solution, that become available through some external source. When a state vector component is removed, all the matrices used in the Kalman filter operation must be modified to correspond to the new state vector. For example, if at some stage the satellite time becomes available from baseband tracking, then the satellite time state vector components can be removed from Kalman filter, and the other vectors and the matrices used in the state update equations and the measurement update equations must be changed to correspond.

Scope of the Invention

It is to be understood that the above-described arrangements are only illustrative of the application of the principles of the present invention. In particular, instead of orbit parameters (of a satellite) being used in the receiver position estimation, information in some other form about the orbit of the satellite may instead be used, and in general information about the satellite may be used, information such as ephemeris or almanac information, provided such information includes or implies information about the satellite orbit. Numerous other modifications and alternative arrangements may be devised by those skilled in the art without departing from the spirit and scope of the present invention, and the appended claims are intended to cover such modifications and arrangements.

What is claimed is:

1. A method for solving for the position of a satellite positioning system receiver, the receiver having a receiver clock with a receiver clock offset and responsive to ranging codes from at least one satellite, the ranging code from the at least one satellite including a navigation component conveying information about the satellite and having a time of flight from the satellite, the method of use in signal conditions where the ranging codes can be baseband processed so that at least a repeating part of the pseudorange for the at least one satellite can be determined, the method comprising the steps of:
    a) including the system time at arrival as an independent and additional variable of the pseudorange function for each of the ranging codes, a variable in addition to the receiver position;
    b) providing estimates of the times of flight of the ranging codes and of the repeating part of the pseudoranges for each of the ranging codes;
    c) receiving information about the at least one satellite sufficient to determine the orbit of the at least one satellite, although not necessarily the position of the at least one satellite; and
    d) solving simultaneously for the receiver position and the system time at arrival.

2. The method of claim 1, further comprising the step of including the receiver clock offset as an independent and additional variable.

3. The method of claim 2, further comprising the step of performing a Taylor-series expansion of the pseudorange function about an initial guess or estimate of each of the independent variables for as many of the satellites as there are independent variables thereby providing a system of pseudorange equations.

4. The method of claim 3, further comprising the step of solving the system of pseudorange equations using a determinate single-point solution that is either an iterative least squares solution or an exact algebraic solution, depending on the number of pseudorange equations.

5. The method of claim 3, further comprising the step of solving the system of pseudorange equations using a Kalman filter.

6. The method of claim 1, wherein the information about the at least one satellite includes the orbit parameters for the at least one satellite.

7. The method of claim 1, wherein the satellite positioning system is the global satellite positioning system (GPS) and the system time at arrival is the GPS time at arrival.

8. The method of claim 1, wherein the repeating part of the pseudorange is the submillisecond part of the pseudorange.

9. The method of claim 1, wherein the method is of use in signal conditions where the ranging codes can be baseband processed providing at least the submillisecond part of the pseudorange.

10. A receiver for a satellite positioning system, the satellite positioning system including at least one satellite providing satellite ranging codes, the receiver having a receiver clock with an unknown receiver clock offset, the receiver able to solve for its position in signal conditions such that even if some of the navigation component of satellite ranging codes accessible to the receiver cannot be demodulated, the ranging codes can be baseband processed so that at least a repeating part of the pseudorange for the at least one satellite can be determined, the receiver comprising:
    i) a non-volatile memory, for storing a program for solving for the receiver position;
    ii) a processor for executing the stored program;
    iii) an antenna responsive to the satellite ranging codes;
    iv) an antenna responsive to information about the at least one satellite and about the location of a nearby reference point;

wherein the program solves for position according to the procedure including the steps of:
  a) including the system time at arrival as an independent and additional variable of the pseudorange function for each of the ranging codes, a variable in addition to the receiver position;
  b) providing estimates of the times of flight of the ranging codes and of the repeating part of the pseudoranges for the ranging codes for each of the at least one satellite;
  c) receiving information about the at least one satellite sufficient to determine the orbit of the at least one satellite, although not necessarily the position of the at least one satellite; and
  d) solving simultaneously for the receiver position and the system time at arrival.

11. The apparatus of claim 10, wherein the program further comprises the step of including the receiver clock offset as an independent and additional variable.

12. The apparatus of claim 11, wherein the program further comprises the step of performing a Taylor-series expansion of the pseudorange function about an initial guess or estimate of each of the independent variables for as many of the satellites as there are independent variables thereby providing a system of pseudorange equations.

13. The apparatus of claim 12, wherein the program further comprises the step of solving the system of pseudorange equations using a determinate single-point solution that is either an iterative least squares solution or an exact algebraic solution, depending on the number of pseudorange equations.

14. The apparatus of claim 12, wherein the program further comprises the step of solving the system of pseudorange equations using a Kalman filter.

15. The apparatus of claim 10, wherein the information about the at least one satellite includes the orbit parameters for the at least one satellite.

16. The apparatus of claim 15, wherein the program further comprises the step of including the receiver clock offset as an independent and additional variable.

17. The apparatus of claim 10, wherein the satellite positioning system is the global satellite positioning system (GPS) and the system time at arrival is the GPS time at arrival.

18. The apparatus of claim 10, wherein the repeating part of the pseudorange is the submillisecond part of the pseudorange.

19. The apparatus of claim 10, wherein the apparatus is of use in signal conditions where the ranging codes can be baseband processed providing at least the submillisecond part of the pseudorange.

20. A system for providing navigation solutions, comprising:
  A) a receiver for a satellite positioning system, the satellite positioning system including at least one satellite providing satellite ranging codes, the receiver having a receiver clock with an unknown receiver clock offset, the receiver able to solve for its position in signal conditions such that even if some of the navigation component of satellite ranging codes accessible to the receiver cannot be demodulated, the ranging codes can be baseband processed so that at least a repeating part of the pseudorange for each satellite can be determined, the receiver comprising:
    i) a non-volatile memory, for storing a program for solving for position;
    ii) a processor for executing the stored program;
    iii) an antenna responsive to the satellite ranging codes;
    iv) an antenna responsive to information about the at least one satellite and about the location of a nearby reference point;
    wherein the program solves for position according to the procedure including the steps of:
      a) including the system time at arrival as an independent and additional variable of the pseudorange function for each of the ranging codes, a variable in addition to the receiver position;
      b) providing estimates of the times of flight of the ranging codes and of the repeating part of the pseudoranges for each of the ranging codes;
      c) receiving information about the at least one satellite sufficient to determine the orbit of the at least one satellite, although not necessarily the position of the at least one satellite; and
      d) solving simultaneously for the receiver position and the system time at arrival; and
  B) a means of providing the information about the at least one satellite.

21. The system of claim 20, wherein the program further comprises the step of including the receiver clock offset as an independent and additional variable.

22. The system of claim 21, wherein the program further comprises the step of performing a Taylor-series expansion of the pseudorange function about an initial guess or estimate of each of the independent variables for as many of the satellites as there are independent variables thereby providing a system of pseudorange equations.

23. The system of claim 22, wherein the program further comprises the step of solving the system of pseudorange equations using a determinate single-point solution that is either an iterative least squares solution or an exact algebraic solution, depending on the number of pseudorange equations.

24. The system of claim 22, wherein the program further comprises the step of solving the system of pseudorange equations using a Kalman filter.

25. The system of claim 20, wherein the information about the at least one satellite includes the orbit parameters for the at least one satellite.

26. The system of claim 25, wherein the program further comprises the step of including the receiver clock offset as an independent and additional vehicle.

27. The system of claim 20, wherein the satellite positioning system is the global satellite positioning system (GPS) and the system time at arrival is the GPS time at arrival.

28. The system of claim 20, wherein the repeating part of the pseudorange is the submillisecond part of the pseudorange.

29. The system of claim 20, wherein the system is of use in signal conditions where the ranging codes can be baseband processed providing at least the submillisecond part of the pseudorange.

30. The system of claim 20, wherein the means of providing the information about the at least one satellite is a cellular base station.

31. The system of claim 20, wherein the means of providing the information about the at least one satellite is the navigation satellite itself.

* * * * *

UNITED STATES PATENT AND TRADEMARK OFFICE
CERTIFICATE OF CORRECTION

PATENT NO. : 6,473,694 B1
DATED : October 29, 2002
INVENTOR(S) : David Akopian and Jari Syrjarinne It is certified that error appears in the above-identified patent and that said Letters Patent is hereby corrected as shown below:

Column 2,
Line 45, "$\hat{f}_i$" should be -- $\hat{\rho}_i$ --

Lines 46-48, "$\bar{a}_i = \frac{\hat{\bar{s}}_i - \hat{\bar{u}}}{\hat{r}_i}$" should be -- $\bar{a}_i = \frac{\bar{s}_i - \hat{\bar{u}}}{\hat{r}_i}$ --.

Line 50, "$\Delta f_i = \hat{f}_i - f_i$" should be -- $\Delta \rho_i = \hat{\rho}_i - \rho_i$ --.

Line 52, "$\Delta f_i =$" should be -- $\Delta \rho_i =$ --.

Line 58, "$\Delta x =$" should be -- $\Delta \bar{x} =$ --.

Column 4,
Lines 13-19, "$\rho_i^{(1)}$" should be -- $\widetilde{\rho}_i^{(1)}$ --, Equation 15, "$\rho_i^{(1)}$" should be -- $\widetilde{\rho}_i^{(1)}$ --.

Column 5,
Lines 62-66, all instances of "$\rho_i^{(1)}$" should be -- $\widetilde{\rho}_i^{(1)}$ --.

Column 6,
Equation 16, "$\rho_i$" should be -- $\widetilde{\rho}_i$ --

Line 34, "$\rho_i$" should be -- $\widetilde{\rho}_i$ --.

Column 7,

Line 26, "$f(\bar{u}_{,u},\tau)$" should be -- $f(\bar{u},t_u,\tau)$ --.

Line 38, "$\rho_i$" should be -- $\widetilde{\rho}_i$ -- and "(16)" should be -- (16') --.

Line 61, "$\bar{s}_i(\tau - \widetilde{t}_i^{(f)}$ ." should be -- $\bar{s}_i(\tau - \widetilde{t}_i^{(f)})$ . --.

Column 8,
Line 67, "32" should be -- = --.

UNITED STATES PATENT AND TRADEMARK OFFICE
CERTIFICATE OF CORRECTION

PATENT NO. : 6,473,694 B1
DATED : October 29, 2002
INVENTOR(S) : David Akopian and Jari Syrjarinne It is certified that error appears in the above-identified patent and that said Letters Patent is hereby corrected as shown below:

Column 9,
Lines 1 and 2, "notations $\nabla_u f_i(\check{u},\hat{t},\hat{t}_u)$, $\partial f_i(\check{u},\hat{t},\hat{t}_u)/\partial\tau$ and $\partial f_i(\check{u},\hat{t},\hat{t}_u)/\partial t_u$ indicate"
should be -- notations $\nabla_u f_i(\hat{\bar{u}},\hat{t},\hat{t}_u)$ $\partial f_i(\hat{\bar{u}},\hat{t},\hat{t}_u)/\partial\tau$ and $\partial f_i(\hat{\bar{u}},\hat{t},\hat{t}_u)/\partial t_u$ indicate--.

Lines 15 and 16, "$\bar{v}_i = \partial \check{\bar{s}}_i(\hat{t})/\partial\tau$" should be -- $\bar{v}_i = \partial\hat{\bar{s}}_i(\hat{t})/\partial\tau$ --.

Column 13,
Equation 42, "$(\bar{\rho}_k - \vec{\hat{\rho}}_k)$" should be -- $(\bar{\rho}_k - \hat{\bar{\rho}}_k)$ --.

Column 16,
Line 46, "vehicle" should be -- variable --.

Signed and Sealed this

Seventeenth Day of August, 2004

JON W. DUDAS
*Acting Director of the United States Patent and Trademark Office*